June 24, 1969 H. A. LEEDER, JR 3,452,248

HEAVY DUTY RELAY-TRANSISTOR FLASHER CIRCUIT

Filed July 23, 1968

Sheet 1 of 3

INVENTOR.
HARRY A. LEEDER, Jr.
BY Bruns & Jenney, Attys.

INVENTOR.
HARRY A. LEEDER, Jr.

BY Bruns & Jenney, Att'ys.

INVENTOR.
HARRY A. LEEDER Jr.

BY Bruns & Jenney, Atty's.

United States Patent Office
3,452,248
Patented June 24, 1969

3,452,248
HEAVY DUTY RELAY-TRANSISTOR FLASHER CIRCUIT

Harry A. Leeder, Jr., Skaneateles, N.Y., assignor to R. E. Dietz Company, Syracuse, N.Y., a corporation of New York Continuation-in-part of application Ser. No. 631,299, Apr. 17, 1967. This application July 23, 1968, Ser. No. 752,121
Int. Cl. B60q 1/52
U.S. Cl. 315—77 9 Claims

ABSTRACT OF THE DISCLOSURE

A bistable circuit for flashing automotive lamps. The circuit includes a relay, two or more cooperable transistors and a charging circuit, and it enables heavy load currents to be switched with high efficiency. The circuit is designed to make electrical transitions between alternate states before the relay operates thereby making the circuit performance independent of the operating characteristics of the relay.

*Cross-reference to related application*

This application is a continuation-in-part of application Ser. No. 631,299, filed Apr. 17, 1967 by the same applicant.

*Background of the invention*

The invention to be disclosed herein relates generally to oscillator circuits, and has particular reference to such a circuit in which semi-conductors are used in conjunction with a relay for switching relatively heavy load currents.

While quite a large number of oscillator circuits have been developed for flashing automotive lamps or the like, only a few have utilized a relay in cooperation with a transistor or transistors for this purpose. With specific reference to circuits of the latter type, the closest prior art known to the applicant is his own Patent No. 3,113,242, issued Dec. 3, 1963. The present invention is an improvement on the patented circuit referred to in that it operates with improved stability of flash rate and percent on-time over the operating voltage and temperature ranges encountered in automotive systems.

*Summary of the invention*

The switching circuit of the invention includes a source of direct current, a plurality of load lamps and a relay which operates to apply full battery voltage to selected ones of the load lamps. The relay is connected in a novel manner to, and operates in conjunction with, two or more transistors which cause the relay contacts to open and close and thereby flash the lamps. An important feature of the circuit is that it makes electrical transitions between alternate states before the relay operates which permits the circuit performance to be completely independent of the relay operating characteristics.

Other important advantages of the circuit are its improved flash rate and percent on-time stability, its capability of switching heavy load currents with high efficiency and the fact that it is an uncomplicated circuit that can be economically manufactured.

*Description of the preferred embodiment*

Figure 1:
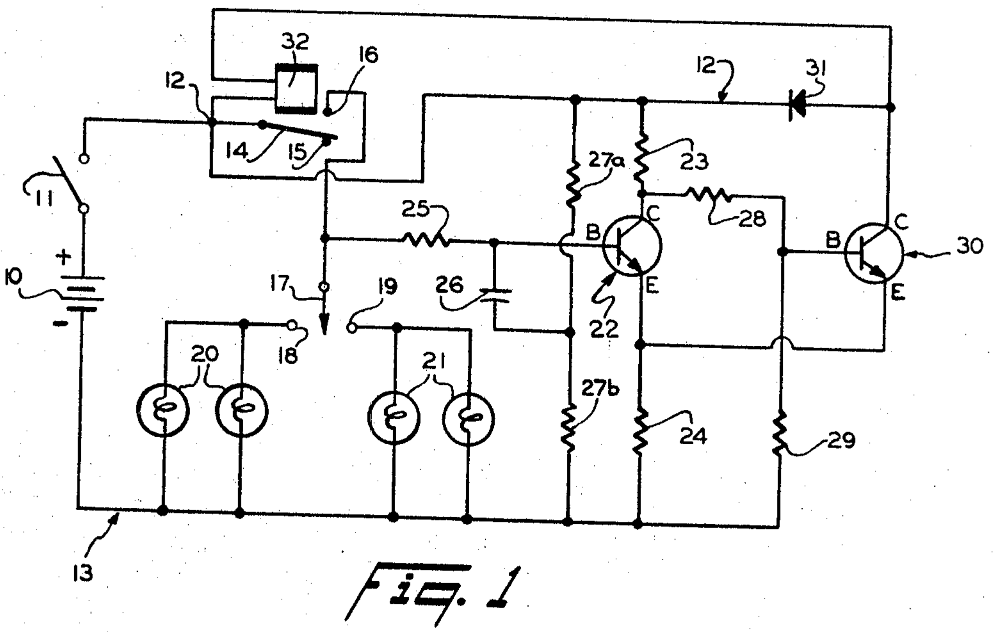
FIGURE 1 is a schematic diagram of a switching circuit embodying the invention.

Having reference now to FIGURE 1, the switching circuit includes a source of direct current 10, which for an automotive flasher is a storage battery, and an ON/OFF switch 11 connected in series. The other switch contact is connected to a point of reference potential 12 while the negative terminal of the battery is connected to a second point of reference potential 13.

Reference point 12 is connected through a relay armature 14 to the open contact 15 of a pair of normally open relay contacts. The other relay contact 16 is connected to the pole 17 of a double-throw turn signal switch having left and right contact positions 18 and 19. Contacts 18 and 19 are respectively connected to left and right turn signal (load) lamps 20 and 21, and the latter are returned to the reference point 13 as shown.

An NPN transistor 22 has its collector connected through a resistor 23 to the point of reference potential 12 and its emitter connected through a resistor 24 to the reference point 13. The base of this transistor is connected through resistor 25 to the pole 17 of the turn signal switch. A voltage divider comprising resistors 27*a* and 27*b* is connected between the reference points 12 and 13, and a capacitor 26 is connected between the junction of these resistors and the base of transistor 22. A second voltage divider formed by resistors 28 and 29 extends between the collector of transistor 22 and reference point 13.

A second NPN transistor 30 has its collector connected to the anode of a diode 31 and also to one side of a relay coil 32. The other side of the coil is connected to the point of reference potential 12 as indicated. The emitter of transistor 30 is connected to the emitter of transistor 22, and the base of transistor 30 is connected to the junction of the voltage divider resistors 28 and 29.

The operation of the above-described circuit is substantially as follows: In the deenergized state, the ON/OFF switch 11 and turn signal switch 17 are both open. When switch 11 is closed, the battery voltage is applied to the circuit via reference point 12 and the cycle of operation is at point *a* in the diagrams of FIGURES 2–6. At this point, transistor 22 is conducting, transistor 30 is not conducting and there is no charge on capacitor 26.

When the turn signal switch is closed in either its right or left position. the first phase of the operating cycle is initiated. Thus, capacitor 26 begins to charge through resistor 25 and lamps 20 or 21, and at the same time the potential at the base of transistor 22 moves toward the potential of the reference point 13. When the base voltage of transistor 22 reaches a particular critical value, the circuit changes state whereby transistor 30 starts to conduct and transistor 22 is shut off. This point in the operation is represented by point *b* in FIGURES 2–6.

With transistor 30 conducting, its collector current energizes the relay 32 which causes the relay contacts to close and full battery voltage to be applied across the load lamps that were rendered operable by the closing of the turn signal switch. This, of course, causes the lamps to light whereupon the first phase of the operation cycle is finished and the second phase begins.

With the relay contacts 15–16 closed, the capacitor 26 begins to discharge through resistor 25 and back to the reference point 12. The potential at the base of transistor 22 now begins to rise with respect to the potential of reference point 13 and toward the potential of reference point 12. When the base voltage reaches a second particular critical value, the circuit triggers back to its original state with transistor 22 conducting and transistor 30 shut off. This point in the operation is represented by point *c* in the diagrams of FIGURES 2–6, and following it the first or charging phase of the operation again occurs, this taking place in the interval between points *c* and *d* in the diagrams. As long as the turn signal switch 17 remains closed, therefore, the circuit will continue to operate with its alternate charging and discharging phases whereby the load lamps are flashed off and on.

The diode 31 is provided in the circuit to suppress the inductive voltage transient which would otherwise occur across the relay coil when the circuit triggers back to its initial state with transistor 22 conducting and transistor 30 shut off. In addition to the diode, a varistor or another resistor or capacitor could be used for this purpose.

If any voltage fluctuations exist in the voltage supply, (caused, for example, by the voltage regulator of an automobile) these variations will be transmitted to the base of transistor 30 by the resistor network 23, 28, 29. This in turn will cause the trigger levels of the circuit to fluctuate, and result in an erratic duration of cycle time.

This undesirable effect is compensated for by including voltage divider 27*a* and 27*b*, and returning capacitor 26 to the tap on the divider. A portion of the power supply transient will then be introduced into the base of transistor 22 via capacitor 26. The net effect is to greatly reduce the relative change in trigger levels, which makes the circuit much less susceptible to transients.

Figure 2:
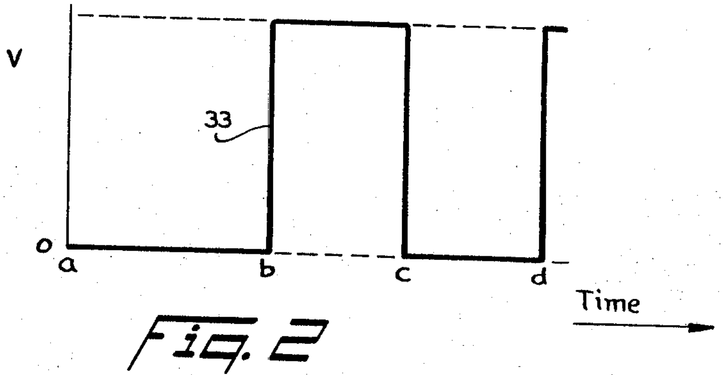
FIGURE 2 is a voltage-time diagram showing the voltage across the load lamps during one cycle of circuit operations.
Figure 3:
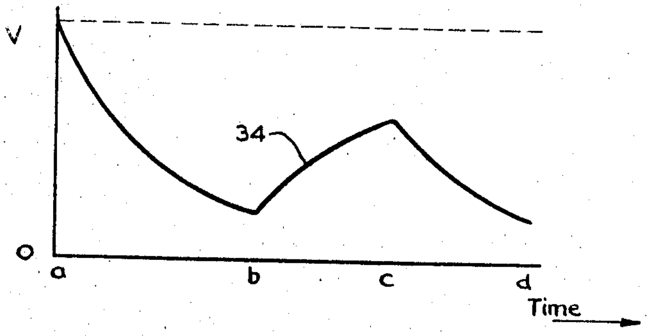
FIGURES 3–6 are voltage-time diagrams showing the voltage at various points in the circuit during a cycle of operation.
Figure 4:
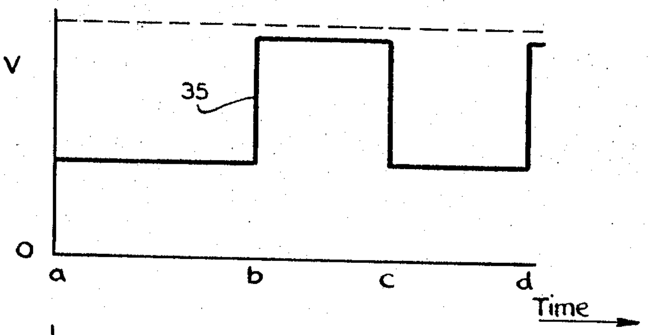
Figure 5:
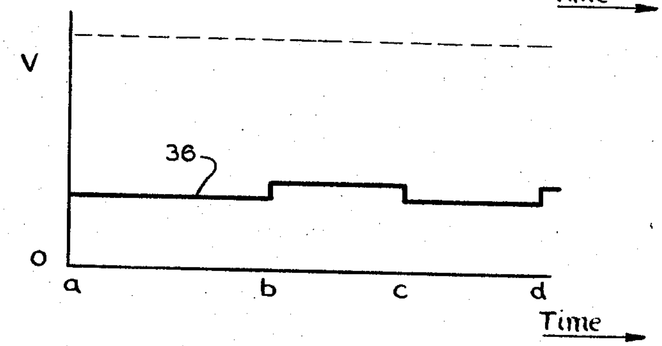
Figure 6:
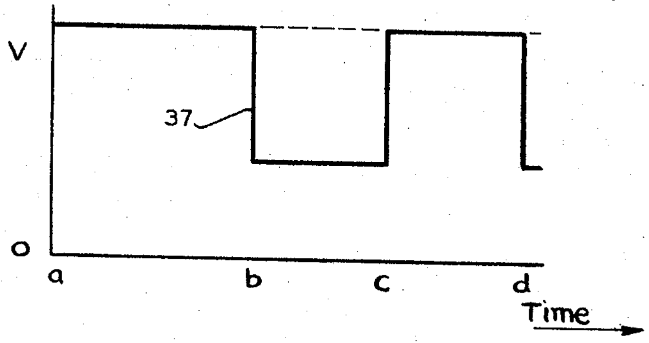

As already stated, FIGURE 2 illustrates the wave form 33 of the voltage across the load lamps during operation of the circuit. In FIGURE 3, the wave form 34 represents the voltage at the base of transistor 22 in relation to the potential of the reference point 13. In FIGURE 4, the wave form 35 represents the voltage at the collector of transistor 22 in relation to the potential of reference point 13. FIGURE 5 illustrates the wave form 36 of the voltage at the emitters of transistors 22 and 30 in relation to the reference point 13. In FIGURE 6, the wave form 37 represents the voltage at the collector of transistor 30 in relation to reference point 13.

While the invention has been described as using transistors of the NPN type with battery and diode polarities as shown in FIGURE 1, it will be understood by those familiar with the art that PNP transistors could equally well be used by simply reversing the battery and diode polarities. In this connection, it should be noted that if NPN transistors are used, the reference points 12 and 13 are respectively positive and negative relative to one another. On the other hand, if PNP transistors are used, the reference points 12 and 13 are respectively negative and positive relative to one another.

Typical existing flashers show a large variation in flash rate and percent on-time over the operating ranges of the supply voltage (nominal voltage ±20%) and ambient temperature (0° F. to 150° F.). In the circuit of the invention, the changes in flash rate and percent on-time are kept very small by careful selection of the values for the voltage divider resistors 27*a*, 27*b* and 28, 29, the charging resistor 25 and charging capacitor 26. Since a wide range of relays can be used in the circuit, component values are listed hereinafter for two of the extremes of possible relays, the values being given by way of example only and not in a restrictive sense.

| | A | B |
|---|---|---|
| Relay coil 32, ohms | 920 | 150 |
| Pull-in current, milliamps | 6 | 50 |
| Resistor 25, ohms | 33,000 | 6,800 |
| Resistor 27a, ohms | 220 | 220 |
| Resistor 27b, ohms | 270 | 270 |
| Resistor 23, ohms | 1,000 | 100 |
| Resistor 24, ohms | 680 | 39 |
| Resistor 28, ohms | 27,000 | 820 |
| Resistor 29, ohms | 68,000 | 2,700 |
| Capacitor 26, microfarads | 55 | 310 |
| Transistors 22, 30 | 2N3903 | 2N3704 |
| Diode 31 | 1N2609 | 1N2609 |

As has been previously mentioned, an important feature of the invention is that the circuit performance is completely independent of the operating characteristics of relay 32. Thus, component values are selected that allow transistor 30 to switch from the non-conducting state to the conducting state in a shorter time interval than that required for the relay contacts 15 to close, and to switch from the conducting state to the non-conducting state before the relay contacts have time to open.

Figure 7:
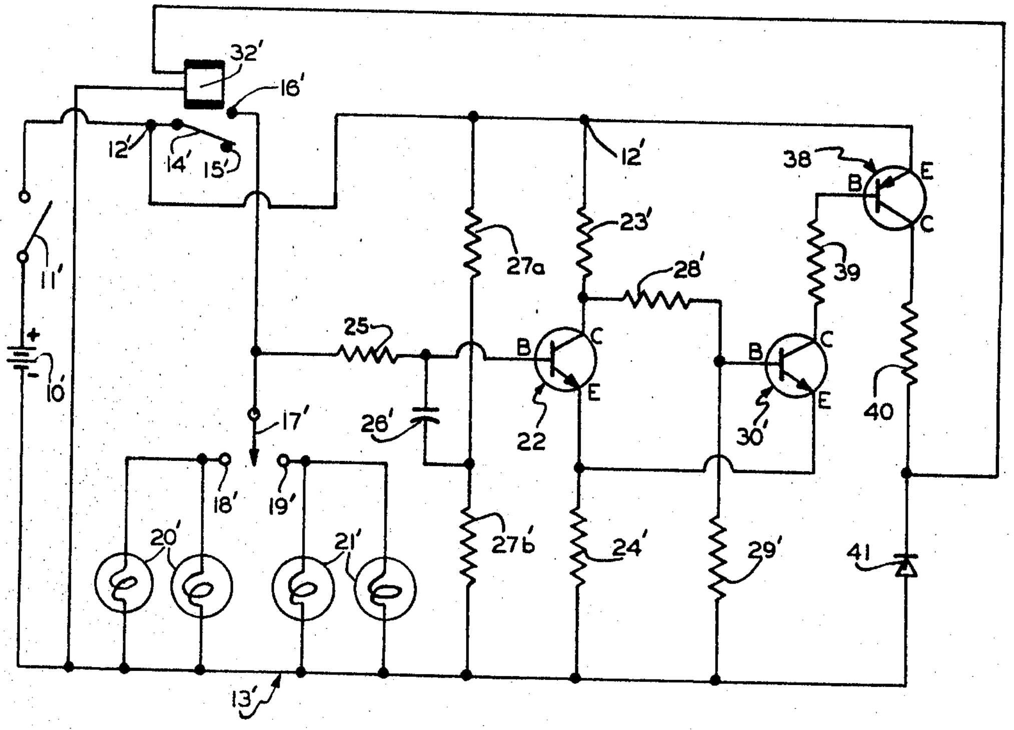
FIGURE 7 is a modification of the circuit of FIGURE 1 in which three transistors are used.

FIGURE 7 is a schematic diagram of a modified form of the switching circuit of the invention in which a third transistor is employed. The latter is a PNP transistor 38 and its base is connected through a resistor 39 to the collector of transistor 30′. The emitter of transistor 38 is connected to the point of reference potential 12′, while its collector is connected through a series combination of resistor 40 and a silicon diode 41 to the second point of reference potential 13′.

One side of the relay coil 32′, instead of being connected to the reference point 12′ as in the circuit of FIGURE 1, is connected to the reference point 13′ as shown. The other side of the coil is connected to the junction of resistor 40 and diode 41. The remainder of the FIGURE 7 circuit is the same as that of FIGURE 1.

The operation of the modified circuit is the same as the operation of the FIGURE 1 circuit up until the point at which transistor 30′ starts to conduct. With transistor 30′ conducting, its collector current flows through resistor 39 and the base-emitter path of transistor 38 causing the latter to start to conduct. The current through the base-emitter path is sufficient to drive transistor 38 into the saturation region of operation in which state its collector current flows through resistor 40 and the coil of relay 32′. This causes the relay contacts to close and full battery voltage to be employed across the selected load lamps which flash on. As in the FIGURE 1 circuit, this completes the first phase of the operation cycle and the second phase then occurs, its sequence being as previously described.

In the modified circuit, the diode 41 serves the same purpose as diode 31 in the FIGURE 1 circuit, i.e. it suppresses the inductive voltage transient that would otherwise occur across the relay coil when the circuit triggers back to its initial state.

The addition of transistor 38 has the advantage of reducing the cost of the circuit even though there are more components. Thus, it permits the use of less expensive transistors than 22 and 30 are required to be in the FIGURE 1 circuit. In addition to this, in the modified circuit the relay 32′ and driver transistor 38 are across the full voltage supply which results in more dependable relay operation and greater freedom of choice in selecting circuit components. In the two transistor form of the circuit, the available voltage across the relay coil is necessarily limited by the circuit design.

As will be understood by those familiar with the art, the invention can be embodied in other specific forms without departing from the spirit or essential characteristics thereof. The embodiment disclosed is, therefore, to be considered in all respects as illustrative rather than restrictive, the scope of the invention being indicated by the appended claims.

What is claimed is:

1. In an electronic switching circuit: a series combination of a switch and a power source connected between first and second points of different reference potential; a load circuit connected between said first and second points of reference potential comprising relay contacts, a turn signal switch and load lamps, in that order; a series circuit connected between said first and second points of reference potential including a first resistor, the collector and emitter electrodes of a first transistor and a second resistor; a third resistor connected between the pole of the turn signal switch and the base of said transistor; a first voltage divider connected between said first and second points of reference potential; a charging capacitor connected between the base of said transistor and an intermediate point on said voltage divider and operable when said turn signal switch is closed to alter the potential of the base of the transistor; a series circuit connected between said first point of reference potential and the emitter of said first transistor comprising a relay coil and the collector and emitter electrodes of a second transistor, in that order; and a second voltage divider connected between the collector of the first transistor and said second point of reference potential, the base of said second transistor being connected to an intermediate point on the voltage divider.

2. A circuit as defined in claim 1 together with voltage transient suppression means connected across said relay coil.

3. A circuit as defined in claim 1 wherein said first and second transistors are NPN transistors and said first point of reference potential is positive and said second point of reference potential is negative relative to one another.

4. A circuit as defined in claim 1 wherein said first and second transistors are PNP transistors and said first point of reference potential is negative and said second point of reference potential is positive relative to one another.

5. In an electronic switching circuit: a source of direct current and a switch in series, said series combination being connected between first and second points of different reference potential; a load circuit connected from said first to said second point of reference potential comprising, in the order given, normally open relay contacts, a turn signal switch having a pole and multiple contacts, and a plurality of load lamps connected to said contacts; a first series circuit connected between said first and second points of reference potential comprising a first resistor, the collector and emitter electrodes of a first transistor and a second resistor; a third resistor connected between the pole of said turn signal switch and the base of said transistor; a first voltage divider connected between said first and second points of reference potential; a capacitor connected between an intermediate point on said voltage divider and the base of said transistor; a second series circuit connected from said first point of reference potential to the emitter of said first transistor comprising, in the order given, a relay coil and the collector and emitter electrodes of a second transistor; and a second voltage divider connected between the collector of the first transistor and said second point of reference potential, the base of the second transistor being connected to an intermediate point on said second voltage divider.

6. A circuit as defined in claim 5 together with voltage transient suppression means connected across said relay coil.

7. In an electronic switching circuit: a series combination of a switch and a power source connected between first and second points of different reference potential; a load circuit connected between said first and second points of reference potential comprising relay contacts, a turn signal switch and load lamps, in that order; a series circuit connected between said first and second points of reference potential including a first resistor, the collector and emitter electrodes of a first transistor and a second resistor; a third resistor connected between the pole of the turn signal switch and the base of said transistor; a first voltage divider connected between said first and second points of reference potential; a charging capacitor connected between the base of said transistor and an intermediate point on said voltage divider and operable when said turn signal switch is closed to alter the potential of the base of said first transistor; a second voltage divider connected between the collector of the first transistor and said second point of reference potential; a second transistor having its base connected to an intermediate point on said second voltage divider, the emitters of the first and second transistors being connected together; a relay coil connected on one side to one of said points of reference potential; and circuit means connecting the other side of said coil to the collector of said second transistor.

8. A circuit as defined in claim 7 wherein said last-named circuit means is a series combination of a resistor and the collector and base electrodes of a third transistor in that order, the emitter of said third transistor being connected to said other point of reference potential.

9. In an electronic switching circuit: a source of direct current and a switch in series, said series combination being connected between first and second points of different reference potential; a load circuit connected from said first to said second point of reference potential comprising, in the order given, normally open relay contacts, a turn signal switch having a pole and multiple contacts, and a plurality of load lamps connected to said contacts; a first series circuit connected between said first and second points of reference potential comprising a first resistor, the collector and emitter electrodes of a first transistor and a second resistor, in the order given; a third resistor connected between the pole of said turn signal switch and the base of said first transistor; a first voltage divider connected between said first and second points of reference potential; a capacitor connected between an intermediate point on said voltage divider and the base of said first transistor; a second voltage divider connected between the collector of the first transistor and said second point of reference potential; a second transistor having its base connected to an intermediate point on said second voltage divider, the emitters of the first and second transistors being connected together; a third transistor having its base connected through a fourth resistor to the collector of said transistor and its emitter connected to said first point of reference potential, the collector of said third transistor being connected through a series combination of a fifth resistor and a transient suppression diode to said second point of reference potential; and a relay coil connected between the second point of reference potential and the junction of said last-named resistor and diode.

References Cited

UNITED STATES PATENTS

| | | | |
|---|---|---|---|
| 3,113,246 | 12/1963 | Leeder | 315—209 |
| 3,204,146 | 8/1965 | Kratochvil | 315—209 |
| 3,263,123 | 7/1966 | Leeder | 315—209 |
| 3,281,611 | 10/1966 | Leeder | 315—209 X |

JAMES W. LAWRENCE, *Primary Examiner.*

C. R. CAMPBELL, *Assistant Examiner.*

U.S. Cl. X.R.

315—209; 307—132; 317—148.5